United States Patent [19]

Budrose

[11] 3,800,315
[45] Mar. 26, 1974

[54] CASSETTE TAPE RECORDER SENSORY ADAPTOR

[75] Inventor: Charles R. Budrose, Melrose, Mass.

[73] Assignee: Bio-Dynamics Inc., Cambridge, Mass.

[22] Filed: Mar. 19, 1971

[21] Appl. No.: 126,040

[52] U.S. Cl. .................. 360/88, 360/2, 94, 35/35 C
[51] Int. Cl. ..................... G11b 25/04, G11b 25/06
[58] Field of Search.......... 274/4 J; 35/35 C; 271/51

[56] References Cited
UNITED STATES PATENTS

| 3,584,882 | 6/1971 | Krtous | 274/4 J |
|---|---|---|---|
| 2,603,006 | 7/1956 | MacChesney | 274/4 J |
| 656,593 | 8/1900 | Bilgram | 271/51 |
| 3,491,461 | 1/1970 | Echterling | 35/35 C |
| 3,610,635 | 10/1971 | Schiff | 274/4 J |

OTHER PUBLICATIONS
Paper Feeding Mechanism, IBM Technical Disclosure, S. Pearson; Vol. 2 No. 3 October, 1959.

Primary Examiner—Samuel B. Rothberg
Assistant Examiner—A. Jason Mirabito
Attorney, Agent, or Firm—Morse, Altman, Oates & Bello

[57] ABSTRACT

An educational device, particularly adapted for teaching the braille system of writing, includes a sensory adaptor having a guideway which operates to receive a card having representations of at least two of the perceptable senses, one of the representations being aural. The sensory adaptor is removably seated in a tape recorder adapted for interconnection with a magnetic tape cartridge in place of the cartridge. As the card is guided by sensors in the tape recorder, the aural representation is reproduced as intelligible sounds and the other representation is rendered available for interpretation.

7 Claims, 5 Drawing Figures

INVENTOR
CHARLES R. BUDROSE

PATENTED MAR 26 1974 3,800,315

INVENTOR
CHARLES R. BUDROSE
BY
Morse, Altman & Oates
ATTORNEYS

CASSETTE TAPE RECORDER SENSORY ADAPTOR

BACKGROUND OF THE INVENTION

1. Field of Invention:

The invention relates to communicative devices and more particularly to a sensory adaptor for use with such devices for presenting representations interpretable by at least two of the perceptable senses.

2. Description of the Prior Art

In the braille system of writing, each letter of the alphabet is designated by a specific arrangement of raised dots in a braille cell configuration. The first 10 letters also serve as numerals. Furthermore, the position of a braille letter in a sentence structure defines the meaning of the letter. Heretofore, devices for teaching the braille system of writing have been unduly complex and expensive.

The invention accordingly comprises the device possessing the construction, combination of elements, and arrangement of parts that are exemplified in the following detailed disclosure, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE PREFERRED EMBODIMENT

Figure 1:
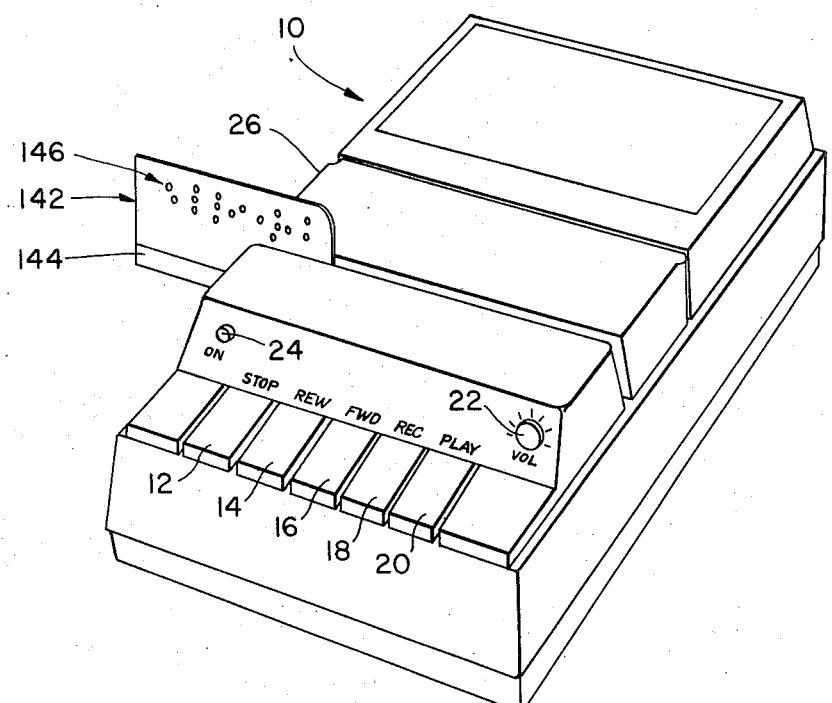
FIG. 1 is a perspective view of a tape recorder including a sensory adaptor made according to the invention.

Referring now to FIG. 1, there is shown a comunicative device 10, for example a cassette tape recorder, which is provided with STOP, REWIND, FORWARD, RECORD, and PLAY controls 12, 14, 16, 18, and 20, respectively, an ON/OFF volume control 22, and an ON indicator 24. A sensory adaptor 26, made according to the present invention, is removably seated within a recess portion 28 of a tape recorder 10 in place of the cassette.

Figure 2:
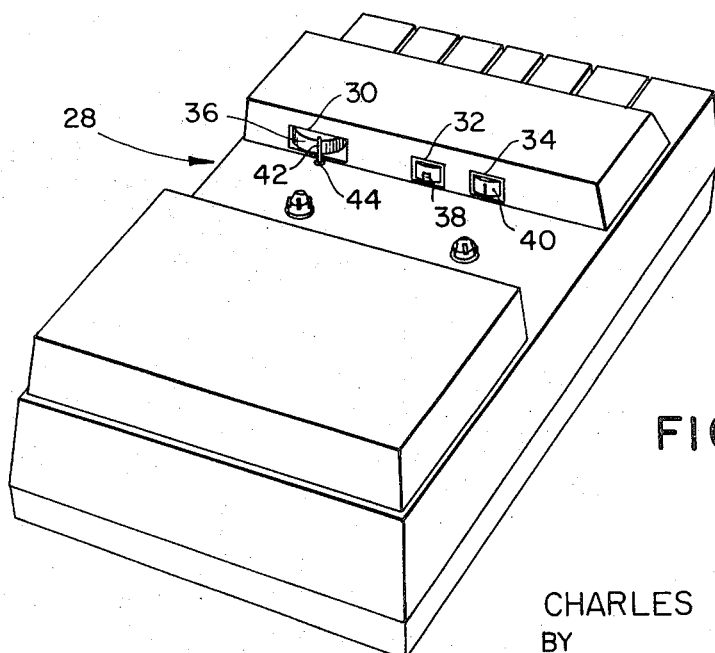
FIG. 2 is a perspective view of the tape recorder of FIG. 1 with the sensory adaptor removed.

As best shown in FIG. 2, the rearward wall of recess 28 is formed with substantially rectangular openings 30, 32 and 34 which are in registration with an idler capstan 36, a play/record sensor head 38, and an erase sensor head 40, respectively. A drive shaft 42 which is in registration with idler capstan 36 projects upwardly from a hole 44 in the bottom of recess 28. Idler capstan 36 and play/record head 38 are mechanically coupled to PLAY control 20 in such a way that, when the PLAY control is depressed, head 38 projects through opening 32 and capstan 36 is pushed forward through opening 30 into tensional engagement with drive shaft 42, capstan 36 being held against drive shaft 42 by means of a spring (not shown), for example. In addition, idler capstan 36, play/record head 38, and erase head 40 are mechanically coupled to RECORD control 18 in such a way that when the RECORD control is depressed, heads 38 and 40 project through their correlative openings and idler capstan 36 is pushed into engagement with drive shaft 42 through opening 30. For a fuller understanding of the relationship between tape recorder 10 and sensory adaptor 26, reference is now made to FIGS. 3, 4, and 5.

Figure 3:
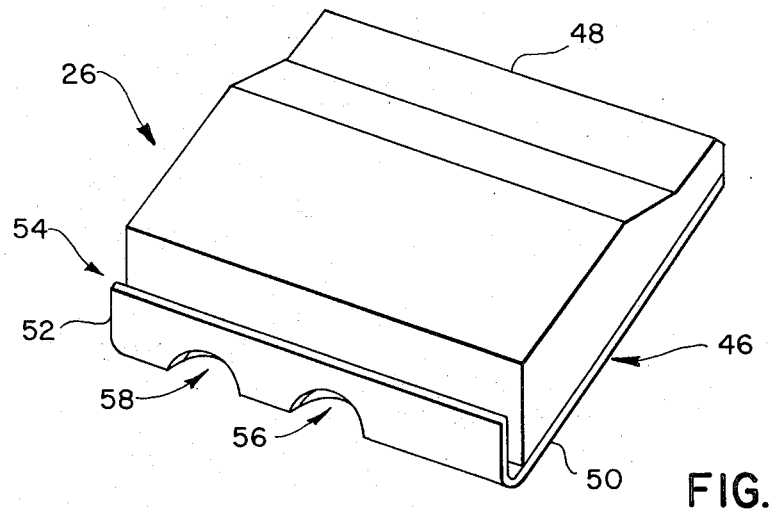
FIG. 3 is a perspective view of the sensory adaptor.

As shown in FIG. 3. sensory adaptor 26 comprises a base 46 and a cover 48. Base 46 is in the form of an L-shped bracket which includes a mounting member 50 having an upturned end 52. Cover 48 defines a substantially rectangular housing which is tapered toward the rearward end. The breadth of base 46 is substantially equal to that of cover 48 and the length of cover 48 is slightly smaller than that of member 50. Cover 48 is mounted to base 46 in such a way that a guideway 54 is formed between the forward face of cover 48 and upturned end 52, the side and rearward edges of member 50 being flush with the sidewalls and rearward face, respectively of cover 48. The forward end of member 50 and the lower portion of end 52 is formed with a pair of apertures 56, 58 which are in mating registration with heads 38, 40, respectively when sensory adaptor 26 is interconnected with tape recorder 10.

Figure 4:
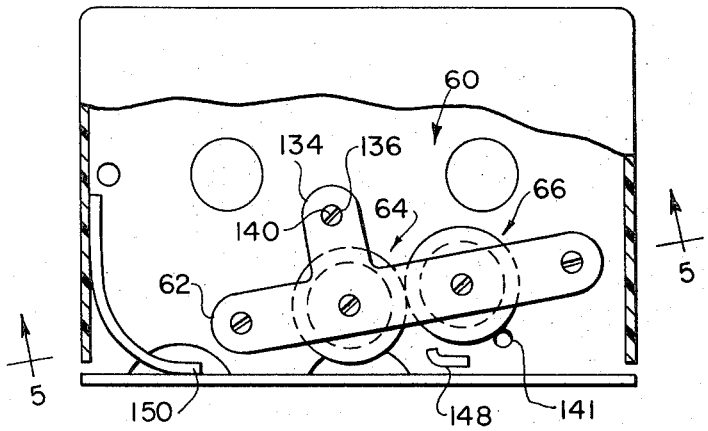
FIG. 4 is a top plan of the sensory adaptor with the cover plate broken away.
Figure 5:
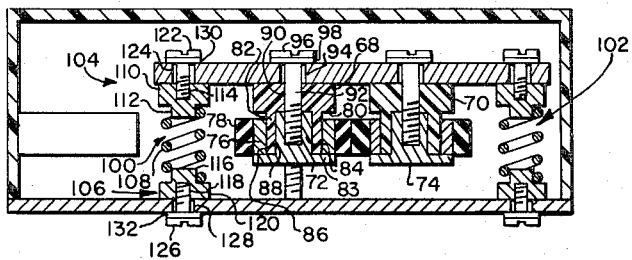
FIG. 5 is a section taken along the lines 5—5 of FIG. 4.

Referring now to FIGS. 4 and 5, it will be seen that a drive assembly 60 is resiliently mounted to member 50 at the forward end thereof by means of a bar 62. Drive assembly 60 comprises a pair of like wheels 64, 66, bearings 68, 70, and bushings 72, 74. Wheel 64 includes a hub 76 which is composed, for example, of a metal such as aluminum, and a rim 78 which is composed, for example, of an elastomer such as natural or synthetic rubber. Bearing 68 includes a shoulder 80 and a socket 82 and is composed, for example, of a polymer such as a polyamide resin. Bushing 72 includes a shoulder 83 and a flange 84 and is composed, for example, of a metal such as brass. Hub 76 is provided with a concentric through hole 86 which operates to receive socket 82 in such a manner that wheel 64 is free to rotate about socket 82, shoulder 80 being slightly larger than hole 86. Socket 82 is formed with a concentric cavity 88 which is adapted to receive flange 84, shoulder 83 being slightly larger than hole 86 and the side wall of socket 82 being slightly longer than flange 84. Shoulder 80 is formed with a concentric through hole 90, flange 84 is provided with a tapped hole 92, and a bar 62 is formed with a through hole 94. Drive assembly 60 is mounted to bar 62 by means of a fastener 96, for example, a screw which is turned into hole 92, a washer 98 is inserted between the head of screw 96 and bar 62.

Bar 62 is connected to member 50 by means of a pair of like resilient mounts 100 and 102. Mount 100 comprises bushings 104 and 106, and a resilient member 108. Bushing 104 includes a body 110 and a head 112 and is provided with a concentric tapped hole 114. Bushing 106 includes a body 116 and a head 118 and is provided with a concentric tapped hole 120. In the illustrated embodiment, head 114 is slightly larger than head 118. Opposite ends of resilient member 108, for example a spring, are pressed onto bodies 110 and 116. Bushing 104 is secured to bar 62 by means of a screw 122 which is turned into hole 114, bar 62 being provided with a through hole 124. Bushing 106 is secured to member 50 by means of a screw 126 which is turned into hole 120, member 50 being formed with a through hole 128. A washer 130 is inserted between the head of screw 122 and bar 62 and a washer 132 is inserted between the head of screw 126 and member 50.

Bar 62 is provided with an arm 134 which is formed with a tapped hole 136 which operates to receive a screw 140 for stabilizing bar 62 with respect to member 50.

Wheel 66 and resilient mount 102 are fastened in a manner similar to that described in connection with wheel 64 and resilient mount 100. As best shown in FIG. 5, it will be noted that the through holes in bar 62 and member 50 which are used for mounting drive assembly 60 are slightly oversized in order to permit adjustment. For example, wheel 66 is aligned so that it frictionally engages drive shaft 42 when sensory adaptor 26 is inserted within tape recorder 10 and wheel 64 is adjusted for frictional engagement with wheel 66, shaft 42 being received in a through hole 141.

Tape recorder 10 is energized to the play position by depression of switch 20 whereby head 38 projects through opening 56. Idler capstan 36 is prevented from engaging drive shaft 42 by upturned end 52. As previously indicated, wheel 66 is aligned for engagement with drive shaft 42 which is rotating in a counter-clockwise direction. In consequence of the engagement of wheel 66 and drive shaft 42, wheel 66 is driven in a counter-clockwise direction. In addition, wheel 64, which bears against wheel 66 is also rotating in a counter-clockwise direction. Wheel 64 is aligned so that there is a slight clearance between projecting head 38 and rim 78.

A body 142, for example a card, having a recording media such as a magnetic tape 144 affixed to a lower portion thereof and a sensory indicia such as braille 146 on an upper portion thereof, is inserted into guideway 54 between head 38 and wheel 64. In consequence, card 142 is frictionally propelled along guideway 54 by wheel 64. A guide 148 steers card 142 away from drive shaft 42. As head 38 contacts magnetic tape 144, the aural representations impressed thereon are reproduced by tape recorder 10. As the aural presentations are reproduced, braille 146 is rendered aviable to the tactile senses.

As best shown in FIG. 4, a flexible arm 150 is mounted to sensory adaptor 26 in registration with opening 58. As previously indicated, when record switch 18 is depressed, heads 38 and 40 project into openings 56 and 58, respectively. Arm 150 is provided for urging magnetic tape 144 against head 40 whereby the aural representations impressed thereon are erased and magnetic tape 144 is readied for reception of new aural representations.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A device adapted for interconnection with a cassete tape recorder in place of the cassette, said tape recorder having at least one sensor head and drive means, said device comprising:
   a. a base having an upturned portion at one end thereof;
   b. said upturned portion formed with at least a first opening in mating registration with said sensor head; said sensor head projecting through said opening when said tape recorder is energized;
   c. a housing mounted to said base;
   d. a guideway formed between said upturned portion of said base and a face of said housing; and
   e. drive assembly means mounted to said base in such a manner that said drive assembly means engages said tape recorder drive means when said device is inserted in said tape recorder;
   f. said drive means including bar means mounted to said base means, first wheel means rotatably mounted to said bar means, and second wheel means rotatably mounted to said bar means in frictional engagement with said first wheel means, said second wheel means in registration with said sensor head, said first wheel means frictionally engaging said tape recorder drive means when said device is inserted within said tape recorder.

2. The device as claimed in claim 1 wherein said first wheel means includes:
   a. hub means formed with a concentric through hole;
   b. rim means operatively connected to said hub means;
   c. bearing means rotatably received within said hub hole, said bearing means formed with a socket; and
   d. bushing means received within said socket, said bushing means having a shoulder slightly larger than said hub hole.

3. The device as claimed in claim 1 wherein said bar means is resiliently connected to said base via mount means.

4. The device as claimed in claim 3 wherein said mount means includes:
   a. first bushing means mounted to said bar means;
   b. second bushing means mounted to said base; and
   c. resilient means, opposed ends of said resilient means mounted to said first and second bushing means.

5. The device as claimed in claim 1 wherein said device includes resilient arm means operatively connected to said device, said upturned end formed with at least a second opening, said resilient arm means being in registration with said second opening.

6. A communicative device comprising:
   a. an audio reproducing mechanism adapted for interconnection with a magnetic tape cartridge;
   b. drive means rotatably mounted within said mechanism;
   c. sensor head means operatively connected to said mechanism;
   d. erase head means operatively connected to said mechanism;
   e. sensory adaptor means removably seated within said mechanism, said adaptor capable of interaction with said mechanism;
   f. said sensory adaptor formed with a guideway operating to receive a card having at least an aural representation and representation of another perceptable sense impressed thereon; and
   g. drive assembly means resiliently operatively mounted within said sensory adaptor means, said drive assembly means frictionally bearing against said drive means;
   h. said drive assembly means including bar means mounted to said base means, first wheel means rotatably mounted to said bar means and second wheel means rotatably mounted to said bar means in frictional engagement with said first wheel means, said second wheel means mounted in registration with said sensor head means, said first wheel means frictionally engaging said drive means when said sensory adaptor means is inserted within said mechanism;

i. said card frictionally engaged between said second wheel means and said sensor head means, said card propelled along said guideway and urged against said sensor head means, said aural representations being presented as audible tones, said other representations made available as said card is frictionally propelled along said guideway.

7. The communicative device as claimed in claim 6 wherein said sensory adaptor includes:
 a. base means having an upturned portion at one end thereof;
 b. said upturned portion formed with at least one opening in mating registration with said sensor head means; and
 c. housing means mounted to said base, said guideway formed between said upturned portion and a face of said housing.

* * * * *